Sept. 23, 1924.

C. C. DAVIS 1,509,717

REEL CARRIER

Filed Nov. 27, 1923

INVENTOR.
C. C. Davis,
BY
Geo. P. Kimmel.
ATTORNEY.

Patented Sept. 23, 1924.

1,509,717

UNITED STATES PATENT OFFICE.

CHARLES C. DAVIS, OF NORTHFIELD, VERMONT.

REEL CARRIER.

Application filed November 27, 1923. Serial No. 677,263.

*To all whom it may concern:*

Be it known that I, CHARLES C. DAVIS, a citizen of the United States, residing at Northfield, in the county of Washington and State of Vermont, have invented certain new and useful Improvements in Reel Carriers, of which the following is a specification.

This invention relates to a reel carrying device, and more particularly to that type of reel carrier wherein the side of the reel itself forms the wheel for the carrier.

The primary object of this invention is the provision as hereinafter set forth, of a reel carrier so constructed that the reel will be supported in a manner which will allow its being readily rolled or moved round, and when it is desired to remove wire therefrom certain parts of the carrier may be changed to lift the reel off the ground and suspend it in a manner which will allow the ready removal of the wire therefrom.

A further object of the invention is the provision in a manner as hereinafter set forth, of a reel carrier having a drawing tongue, which tongue may be shifted to engage the ground and raise the carrier in the position of a tripod to suspend a reel of wire above the ground.

A still further object of the invention is the provision in a manner as hereinafter set forth, of a reel carrier which may be folded for carrying or further may be disassembled, if it is desired to pack the carrier in a small space.

A further and final object of the invention is the provision in a manner as hereinafter set forth, of a reel carrier which will be light, strong and inexpensive to manufacture.

The invention will be best understood from a consideration of the following detailed description taken in connection with the accompanying drawings forming a part of this specification, with the understanding that the invention is not confined to any strict conformity with the showing of the drawings, but may be changed and modified so long as the changes and modifications mark no material departure from the salient features of the invention as expressed in the appended claims.

Figure 1:
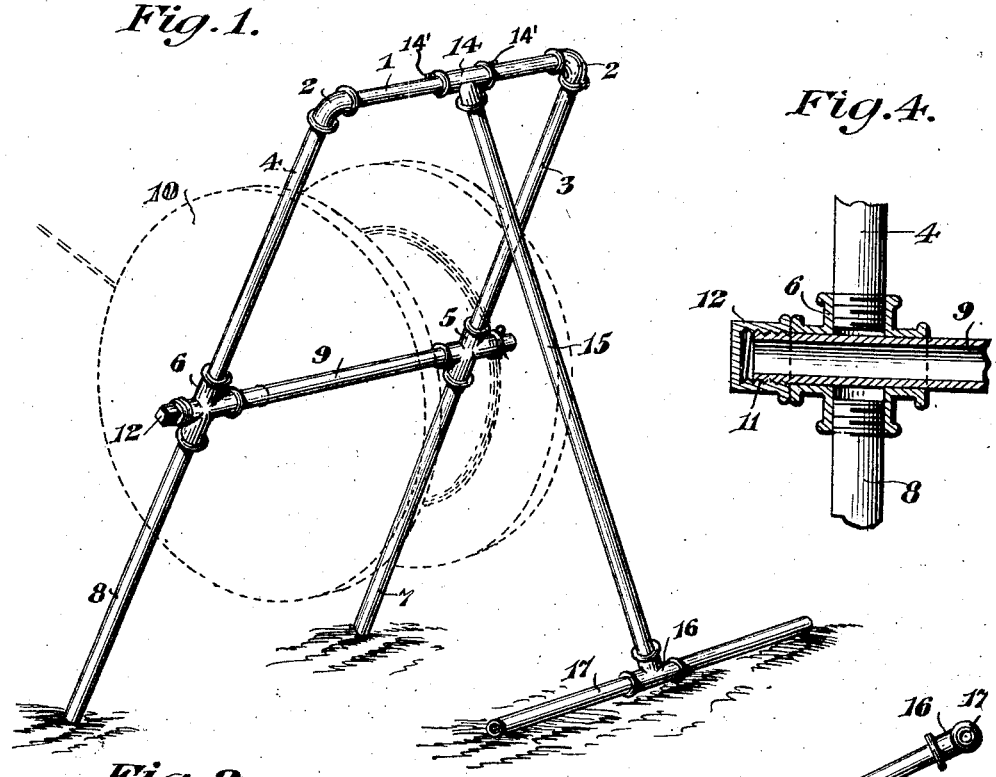
Figure 1 is a perspective view of the device embodying this invention, showing the position assumed while suspending a reel of wire.

Referring now to the drawings in detail wherein like numerals of reference indicate corresponding parts throughout the several views of the drawings, the device embodying this invention comprises a substantially U-shaped frame, having the connecting yoke 1, carrying at each end an elbow union 2, which elbow unions have connected thereto the upper side legs 3 and 4, as shown. The lower portions of each of these upper side legs 3 and 4 are inserted into four-way unions 5 and 6, respectively, and these four-way union members have connected thereto the lower side leg members 7 and 8. These lower leg members 7 and 8, as clearly shown, are inserted into the unions at the side opposite the side upon which the members 3 and 4 are connected, thus continuing the side legs of the U-shaped frame a substantial distance.

Figure 4:
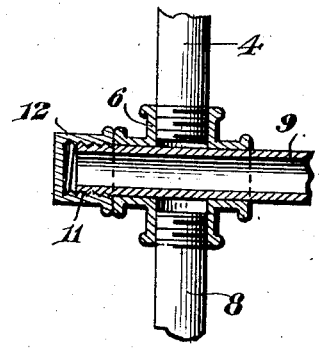
Figure 4 is a detailed sectional view showing the connection of the reel carrying bar with the frame of the device, from one side.
Figure 5:
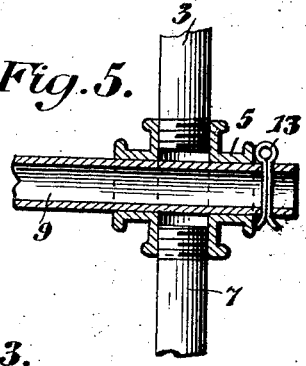
Figure 5 is a detailed sectional view showing the connection of the reel carrying bar with the frame upon the opposite side.

As clearly shown in Figures 4 and 5, the four-way union members have only two of their arms threaded, and these are threaded to receive the ends of the side leg members 3 and 4, and 7 and 8. The other arms of these unions receive therein the ends of a transverse bar 9, which bar extends across between the leg members of the frame and is adapted to receive thereon the wire reel 10. One end of this transverse bar 9 is threaded, as fully shown in Figure 4, as at 11, to receive thereon the cap 12, which abuts the end of the outer arm of the four-way union member 6. The other end of the bar 9 is apertured to receive a cotter pin 13, which also abuts the end of the outer arm of the union member 5, to prevent the withdrawal of the bar from the union member.

Figure 2:
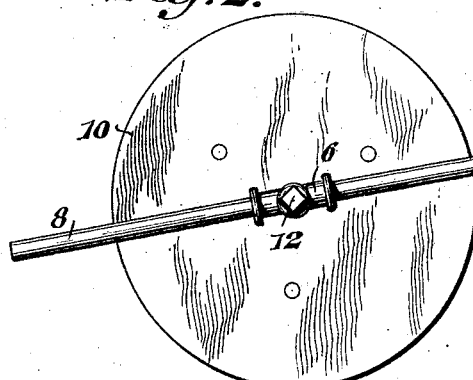
Figure 2 is a side elevation of the device, carrying a wire reel and utilizing the sides of the same as supporting wheels for the frame when transporting the reel.
Figure 3:
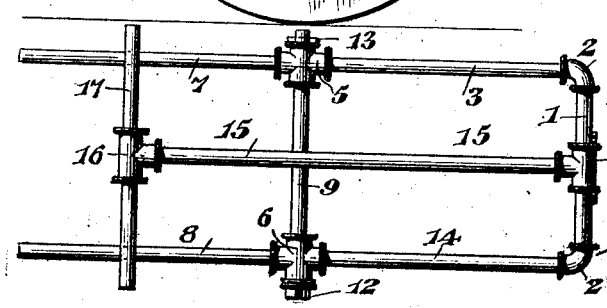
Figure 3 is a plan view of the device in its closed position.

Mounted upon the yoke 1 is a T-shaped union 14, into the leg of which is inserted the draw bar 15, which draw bar has its outer end inserted into the leg of a second T-shaped union member 16, and the head of this union member 16 has passed therethrough the handle bar 17. The union 14 is loosely mounted on the yoke 1, so that the handle and draw bar may be lifted, or moved about the yoke 1 to position the handle and draw bar, as shown in Figure 1, in order to support the reel 10 from the ground, or to extend the handle and draw bar forwardly of the yoke 1, shown in Figure 2, so that the frame and reel may be drawn over the ground, or as shown in Figure 3 the draw bar and handle may be swung back across the frame in a folding position so that the frame may be carried in the hand.

Tapped into the yoke 1, are two set screws 14' which prevent the side shifting of the union 14 and thus retain it in the center of the yoke.

It is preferred to make the structure of pipe material and with pipe unions, as is shown by the drawings, as a great deal of strength can be obtained from this pipe construction with the minimum amount of weight, however, the applicant does not limit himself to the use of tubular members for his frame, but the same may be constructed with solid bar material of smaller diameter, if desired.

Having thus described my invention, what I claim is:—

1. In a device of the character described, the combination with a frame having parallel side bars and one end cross bar, of a supporting bar removably carried by the side bars intermediate their ends and adapted to form a rotatable axis for a reel, and a combined draw bar and handle swingingly connected centrally of said cross bar and adapted when in one position to serve as a prop for said frame when standing upon a foundation and when in another position constituting a draft device, and when in still another position to be substantially parallel with and in folded relation to the said side bars.

2. A reel carrier of the character described comprising, a frame including pipe sections and unions therefor, a cross reel supporting bar slidable in certain of the unions between the sides of said frame intermediate their ends, for the removal of said bar, means for retaining the bar in said unions, and means swingingly carried by said frame and constituting a draft element and further constituting a third leg to support the device in set up position.

3. A reel carrier of the character described comprising, a substantially U-shaped frame, a transverse reel carrying member connecting the legs of said frame intermediate their ends, and a draw bar pivotally connected centrally of the yoke of said frame.

4. A reel carrier of the character described comprising, a substantially U-shaped frame, a removable transverse reel carrying bar connecting the legs of said frame intermediate their ends, a draw bar swingingly connected centrally of the yoke of said frame, and a handle bar carried by and extending transversely to the draw bar and through the outer end thereof.

5. A reel carrier of the character described comprising, a substantially U-shaped frame having each leg in two sections, a four-way connection between the sections of each leg, a transverse reel carrying member connecting the said four-way connections, and a draw bar connected to the yoke of the frame.

6. A reel carrier of the character described comprising, a substantially U-shaped frame having each leg in two sections, a four-way connection between the sections of each leg, a transverse reel carrying member connecting the said four-way connections, a draw bar connected to the yoke of the frame, said reel carrying member having its ends extending through said connections, and means at each end of said member to retain it in position.

7. A reel carrier of the character described comprising, a substantially U-shaped frame having each leg in two sections, a four-way connection between the sections of each leg, said four-way connections having right angled communicating passages through the longitudinal center of the arms, a transverse reel carrying bar having its ends extended through the passage in the two aligned arms of each connection, a cap threaded on one end of said bar and abutting one of said connections to prevent the moving of said bar in one direction, a removable means passing through the other end of said bar and abutting the outer side of said other connection to removably retain said bar in position between the connections, a draw bar swingingly connected to the yoke of said frame, and a transversely extending handle bar carried by said draw bar at the outer end thereof.

In testimony whereof, I affix my signature hereto.

CHARLES C. DAVIS.